United States Patent [19]
Ricard

[11] Patent Number: 5,629,856
[45] Date of Patent: May 13, 1997

[54] PROCESS AND DEVICE FOR AVOIDING FRAUD ON A TAXI EQUIPPED WITH A TAXIMETER OR ON A TRUCK EQUIPPED WITH A CHRONOTACHOGRAPH

[76] Inventor: Claude Ricard, 52 Cours Gambetta, 13100 Aix-en-Provence, France

[21] Appl. No.: 374,095

[22] Filed: Jan. 18, 1995

[30] Foreign Application Priority Data

| Jan. 25, 1994 | [FR] | France | 94 01046 |
| Jun. 8, 1994 | [FR] | France | 94 07203 |

[51] Int. Cl.$^6$ .................................................. G07B 13/02
[52] U.S. Cl. ............................. 364/464.27; 235/30 R; 235/45; 340/434
[58] Field of Search .................... 235/30 R, 30 A, 235/45; 340/434, 438; 364/467; 377/24.1

[56] References Cited

U.S. PATENT DOCUMENTS

| 3,809,312 | 5/1974 | Warrick et al. ............ 235/30 R |
| 3,818,186 | 6/1974 | Harwood ..................... 235/30 R |
| 4,001,777 | 1/1977 | Alexander ................... 340/434 |
| 4,140,899 | 2/1979 | Borgstrom ................... 235/95 C |
| 4,217,484 | 8/1980 | Gerst ............................ 377/24 |
| 4,389,563 | 6/1983 | Ricard ...................... 235/30 R X |
| 4,549,168 | 10/1985 | Sieradzki .................. 340/525 |
| 5,121,097 | 6/1992 | Van Zeggeren ............ 340/434 |
| 5,155,747 | 10/1992 | Huang ..................... 364/467 X |

Primary Examiner—Edward R. Cosimano
Attorney, Agent, or Firm—Parkhurst, Wendel & Burr, L.L.P.

[57] ABSTRACT

An electronic device, placed in an impregnable envelope and electrically connected between an electronic sensor and a taximeter or chronotachograph, tests at least one of the internal characteristics of the active dipole present between two output wires of the sensor or electrical characteristics of a signal present at its terminals. The test values are then compared with one or several reference values. An electronic anti-fraud action is triggered in the event of nonconformity between the test values and the reference values. One anti-fraud action includes preventing the functioning of the taximeter or chronotachograph.

21 Claims, 3 Drawing Sheets

5,629,856

PROCESS AND DEVICE FOR AVOIDING FRAUD ON A TAXI EQUIPPED WITH A TAXIMETER OR ON A TRUCK EQUIPPED WITH A CHRONOTACHOGRAPH

FIELD OF THE INVENTION

The present invention relates to a process and device for avoiding fraud in a taxi equipped with a meter or in a truck equipped with a chronotachograph, the vehicle—taxi or truck—being equipped with at least one electronic sensor at least used for setting its meter or chronotachograph into action.

BACKGROUND OF THE INVENTION

A so-called "electronic" sensor in an automobile vehicle is a transducer which tests a rotating mechanical member of the vehicle, the speed of rotation of this mechanical member being representative of the number of wheel revolutions made by the vehicle, and the generally alternating electric signal furnished by this transducer corresponding to electric pulses representative of this number of wheel revolutions.

Conventionally, this rotating mechanical member is most often one of the gears of the gear box.

It is possible to avoid fraud on the taximeter or chronotachograph which receives and processes these electric pulses by rendering all the circuit included between the output of the sensor and the taximeter or chronotachograph, impregnable by means of a mechanical shielding.

Such mechanical shielding prevents, in particular, the taxi—or truck driver from inserting two in the two respective signal output wires of the sensor so as to be able to connect thereto a pulse generator in parallel on said output of the sensor. In this method of fraud, the defrauder often chooses a pulse generator whose output impedance is much lower than that of the sensor, and the pulses delivered by this generator either smother the pulses delivered by the sensor and therefore replace them, or are added thereto.

The assembly of the sensor itself may advantageously be mechanically shielded, and therefore rendered impregnable, by means of a bell which covers the sensor and which is fixed and sealed with leads on the gear box.

However, modern vehicles are now equipped more and more often with a so-called A.B.S. braking system which uses an electronic sensor for each vehicle wheel. Generally, these vehicles are equipped with disc brakes on the four wheels, and consequently each electronic sensor is a proximity sensor which tests the presence of notches made to that end on the outer edge of the brake disc.

In such a case, it is typical that the electronic sensor for setting the speedometer on the instrument panel as well as the taximeter or chronotachograph into action, is one of the A.B.S. sensors already present on the vehicle. The electric pulses delivered by this sensor are then applied simultaneously to the A.B.S. braking system, to the speedometer on the instrument panel and to the taximeter or chronotachograph.

This raises a problem if it is desired to avoid the above-mentioned fraudulent action of the taximeter or chronotachograph, as, in that case, it is virtually no longer conceivable to connect the sensor in question to its user circuit by a mechanically shielded cable. This sensor is in fact located on the wheel and on a portion thereof which, although not rotating, is nonetheless subjected to sporadic displacements due to the articulated nature of this wheel.

Shielded cables which present a certain suppleness indeed exist on the market, but such suppleness is limited and in any case there would be a fairly fragile point of break at the point of connection of such a shielded cable on the sensor.

In addition, such a shielded cable would pass in the immediate proximity of the hydraulic conduits and the electric safety cables which are associated with the device braking the wheel in question. During the movements of articulation of the wheel, these hydraulic conduits and electric safety cables would then rub against the shielded cable, the movements of these different cables and conduits not being able to be strictly synchronous.

This would result in rapid wear of these hydraulic conduits and electric cables, and consequently a risk of piercing and rupturing of the circuit.

It is an object of the invention to overcome this drawback by proposing a process and a device for avoiding fraud on a taxi or a truck, even if the taxi or truck is equipped with an A.B.S. braking system.

SUMMARY OF THE INVENTION

The invention relates to a process and device for avoiding fraud on a taxi equipped with a taximeter or on a truck equipped with a chronotachograph, the vehicle—taxi or truck—being equipped with at least one electronic sensor which at least is used for the taximeter or the chronotachograph, this process comprising the steps of:

being connected directly in parallel on two or on the two electric signal output wires of this sensor, and in triggering off an electronic anti-fraud action which at least consists in modifying the electronic data normally transmitted to the taximeter or chronotachograph, if at least one of the internal characteristics of the active dipole then present between these two wires, and/or at least one of the characteristics of the electric signal available between these two wires during normal displacement of the vehicle, has been modified with respect to reference values.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
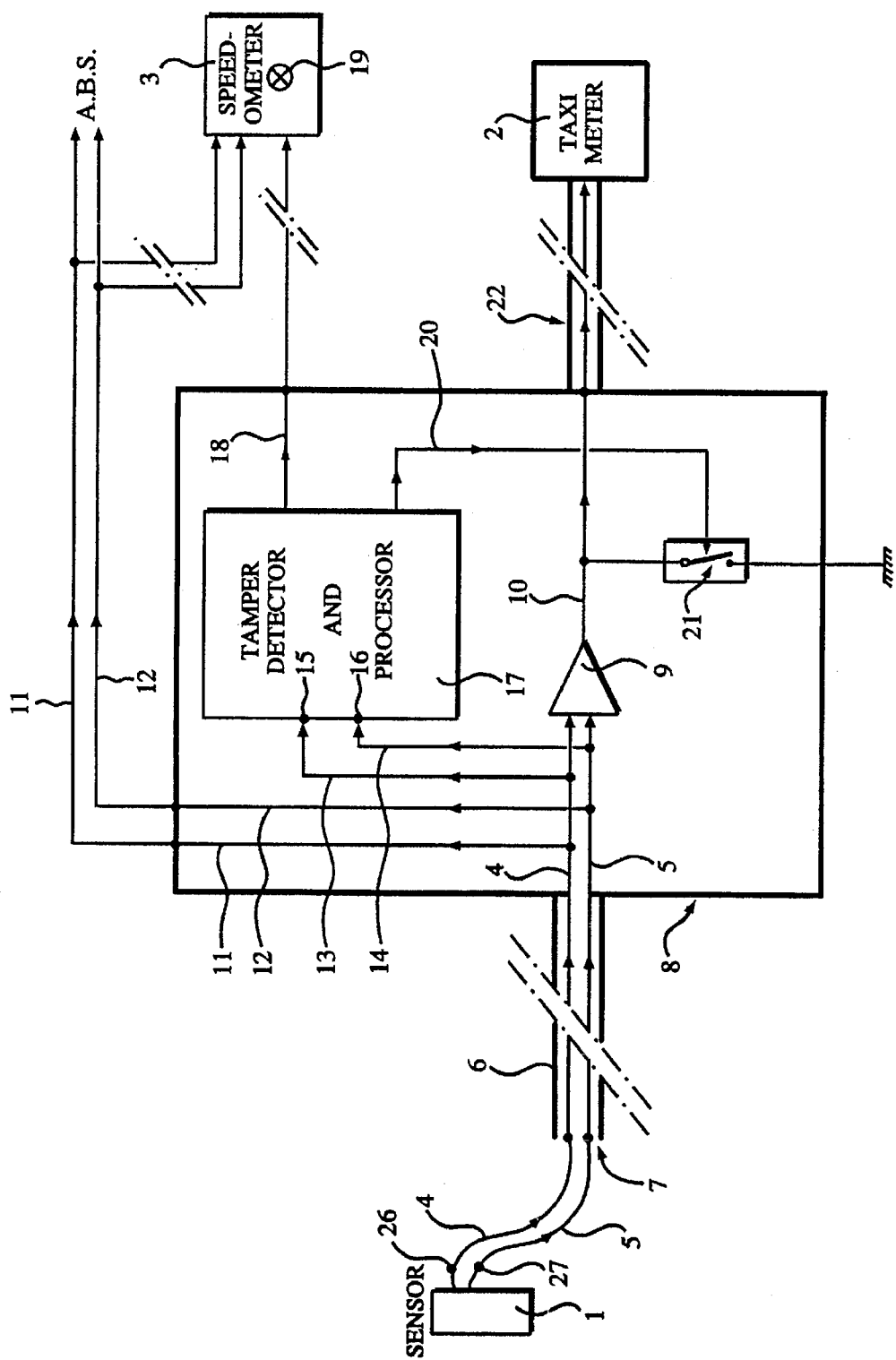
FIG. 1 is a block diagram of a simple embodiment of the invention.

Referring now to the drawings and firstly to FIG. 1, reference 1 designates an electromagnetic sensor (or "electronic sensor") detecting the number of wheel revolutions made by a taxi provided with a taximeter 2 and a speedometer provided on its instrument panel 3.

Instead of a taxi, it may be question of a truck and, in that case, reference 2 designates the chronotachograph with which the truck is fitted.

In this Figure, the vehicle—taxi or truck—is provided with an A.B.S. braking system, with the result that the sensor 1, whose object is to furnish electric signals, representative of the number of wheel revolutions, to the speedometer on the instrument panel 3, on the one hand, and to the taximeter or chronotachograph 2, on the other hand, is quite simply one of the sensors normally used for operating the A.B.S. braking system.

Sensor 1 is therefore placed on a wheel of the vehicle, with the result that, as explained hereinabove, it is difficult to envisage protecting its two electric signal output wires 4, 5 by a mechanical shielding 6.

According to a particular feature of the invention, such mechanical shielding 6 may, at the most, be provided from point 7 at the level of articulation of the wheel, but, in any case, not between this point 7 and the sensor 1. Due to the mechanical shielding 6, the defrauder can connect a possible auxiliary pulse generator only on that part of the wires 4 and 5 which is located between point 7 and the sensor 1, which largely facilitates visual anti-fraud checks, but, however, does not totally prevent such a fraud from being made.

It should be noted that, between point 7 and the taximeter or chronotachograph 2, the mechanical shielding provides total impregnability and it comprises, successively, the section of shielded cable 6, an impregnable shielded box 8 containing electric circuits, and another section of shielded cable 22.

The term "shielded cable" is understood here to mean an electric cable surrounded by a mechanically impregnable shielding. It goes without saying that such shielding is generally also an electrical earth shielding, but, here, it is generally question of a shielding of mechanical order, and not of a shielding of purely electrical order.

The impregnable shielded box 8 contains an operational amplifier 9 which receives the electric signal furnished by the sensor 1 on the two signal output wires 4 and 5, and which consequently furnishes on its output wire 10 a shaped signal which is applied, via the shielded cable 22, to the taximeter or chronotachograph 2. This amplifier 9 also has a role of separator, and it therefore makes it possible to work on the signal present on wire 10 without the signal present on wires 4 and 5 upstream of the amplifier 9 being affected.

As shown in FIG. 1, two other pairs of wires are connected, in the box 8, on the pair of wires 4, 5 upstream of the separation and shaping amplifier 9.

A first pair of wires 11, 12 which emerge from box 8 to supply pulse signals on the one hand to the A.B.S. circuits (not shown) and, on the other hand, to the speedometer on the instrument panel 3 of the vehicle, and A second pair of wires 13, 14 are connected to the two input terminals 15, 16 of an electronic device 17 for testing internal characteristics of the active dipole present between wires 4 and 5 that is sensor 1 and its load, and/or for testing at least one of the characteristics of the signal present between the two wires 13, 14 when the vehicle is moving at at least a predetermined speed.

By way of non-limiting example, the above-mentioned characteristic of the signal present between the two output wires 4, 5 of the sensor 1 may advantageously be the cyclic ratio of the pulses deducted, after possible peak-clipping, from the alternating or purely pulse signals furnished by sensor 1. It is recalled here that the cyclic ratio of the pulses is the ratio between the duration of each pulse and the complete time interval, or period, which separates the beginning of the rising edge of this pulse from the beginning of the rising edge of the following pulse.

The internal characteristic of the dipole may be its impedance, preferably taken in the very general sense, i.e. without distinguishing its resistance, its inductance and its capacitance, but, rathermore, as will be seen hereinafter, by noting the pulse or frequency response of this dipole.

Non-limiting examples of the electronic characteristic-testing device 17 will be described hereinafter with reference to FIGS. 2 to 4.

When installing the sensor 1 and the taximeter or chronotachograph 2 on the vehicle, tests are made on the vehicle moving at one or more predetermined speeds. One or more measurements, by the device 17, of said characteristics, result frown these tests, and the result of these test-measurements is memorized in the device 17, which preferably contains a microprocessor, or other logic calculation and control member, as will be seen hereinafter.

Subsequently, the electronic device 17 compares the values of characteristics that it tests systematically, continually or episodically, with these memorized characteristics.

If these values do not conform, the electronic member 17 emits, on a first output wire 18, an alarm signal towards the instrument panel. This alarm signal triggers off maintained information, visual or sound, which is materialized for example by a preferably very bright light 19 on the instrument panel 3 lighting up or, even better, by the emission of a preferably unbeatable sound signal. The electronic member 17 also emits on on a second output wire 20, a signal controlling closure of a static switch 21 with semi-conductors which is connected between wire 10 and earth, with the result that no pulse representative of the number of wheel revolutions can then arrive at the taximeter or chronotachograph 2, the complete functioning of which is therefore prevented.

In order not to trigger off these two effects by mistake should a parasite accidentally make a comparison which apparently does not conform, the test circuit 17 emits non-conformity signals on its outputs 18 and 20 only if this non-conform comparison is of recurrent nature, i.e. is repeated several successive times regularly and not accidentally. Similarly, it emits a non-conformity signal if this comparison reveals a very considerable, abnormal difference with respect to the value that it should have. This is the case for example when the cyclic ratio of the pulses is 0.9 instead of being 0.1 for example.

It should be noted that the prior memorization of the reference value or values which serve to determine fraud by comparison therewith, is not compulsory and, in a simplified embodiment, of which an example will now be described, this or these reference values may be quite simply one or more values set in advance and characteristic of normal operation of the apparatus.

This is particularly so when an electronic sensor 1 and members of the vehicle, on which this sensor is connected, are used which always furnish, generally as soon as the vehicle is moving at a speed greater than a very slow, minimum speed of some kilometers per hour, electric pulses whose cyclic ratio is constant whatever the speed of the vehicle, this cyclic ratio being of a value generally equal to 0.5. It is the case, for example, when an electronic Hall effect sensor 1, which tests the passage of the teeth of a pinion of the gear box, is used: the width of these teeth, as well as the gaps which separate them, is generally always the same and the cyclic ratio of the pulses delivered by the Hall effect sensor is then always 0.5, except, of course, at very low speed where start and stop may be effected in the middle of a tooth or a gap between two successive teeth.

In such a case, the electronic device 17 permanently tests the cyclic ratio of the pulses when their number per second corresponds to a speed of the vehicle which is greater than the minimum speed mentioned above. If it detects a variation in the cyclic ratio of the order of, for example, more than some percent with respect to its normal value, which is therefore generally 0.5, it deduces therefrom that there is fraud present and it consequently sends its fraud detection signal, for example on its output 20 as described hereinbefore. For example, fraud is detected if the cyclic ratio of the pulses proves less than or equal to 0.45 or greater than or equal to 0.55, instead of being 0.5.

Of course, in the case of the set value of the cyclic ratio being different from 0.5, for example because a pinion with non-regular teeth is used, it is this other set value which should be taken into consideration.

However, device 17 must not wrongly detect fraud if, as is often the case, an accidental parasitic pulse appears which has nothing to do with a fraud. This is in fact easy to differentiate, as these parasitic pulses are always so brief that, if they were regularly repetitive, they would finally correspond to speeds totally impossible for the vehicle, as they would be too high. According to the invention, device 17 does not take into account a cyclic ratio which corresponds to an electric pulse of the sensor which would itself correspond to a speed greater than the maximum speed normally possible for the vehicle, for example at a speed greater than 180 km/hr. By way of non-limiting numerical example, device 17 does not take into account pulses whose duration is largely less than 800 microseconds.

It should be noted that, in this very simplified embodiment, device 17 can simply compare the cyclic ratio of the pulses with a set value of, for example, 0.5: In that case, it does not comprise means for testing other characteristics, such as impedance test.

Instead of being connected to a static switch 21 which short-circuits the output of the amplifier 9, the control wire 20 may also be connected, by passing in the shielded cable 22, directly to the taximeter or chronotachograph 2 to furnish to the latter the information whereby it must not take into account the pulses counting the number of wheel revolutions which it receives. This information may advantageously be a train of possibly coded pulses, also possibly constituting dialogue signals between the microprocessor or equivalent logic member contained in the test device 17, and the microprocessor or equivalent logic member of the taximeter or chronotachograph 2.

Like the tests of measurement made when installing the sensor 1 and the taximeter or chronotachograph 2, at least certain of said subsequent systematic tests of characteristics (for example the cyclic ratio of the pulses) are made when the frequency of the pulses furnished by the sensor (i.e. in fact the speed of the vehicle) is greater than a minimum value below which the test could not be validly made, or not be made at all. Furthermore, such a test is preferably effected for several predetermined frequencies.

Figure 2:
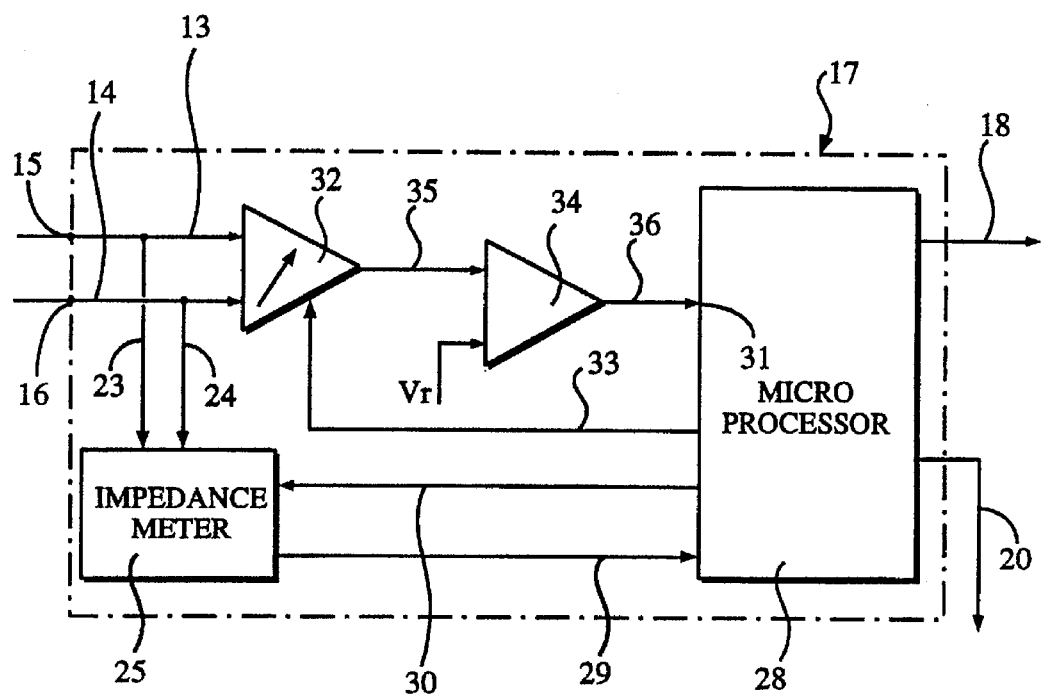
FIG. 2 is a block diagram of the characteristic test device equipping the device of FIG. 1.

A general embodiment of the electronic test device 17 is shown in FIG. 2.

In this device 17, the two input wires 13, 14 mentioned above are connected, via wires 23 and 24, to a circuit 25 for testing the impedance of the active dipole present between the terminals 15 and 16, or, in other words, between the signal output terminals 26 and 27 (FIG. 1) of the electronic sensor 1.

Such an impedance test circuit 25 exists on the market in the form of an integrated circuit which is incorporated in various measuring apparatus such as digital multimeters.

The electronic device 17 is equipped with a microprocessor 28, or other logic calculation and control member.

The impedance measurement which is effected by the integrated circuit 25 is digitized by this integrated circuit and is transmitted to the microprocessor 25 via a link 29. On the other hand, such measurement is preferably triggered off or validated by the microprocessor 28, via a control link 30, only when the vehicle is stationary, i.e. when the microprocessor 28 does not receive any series of pulses coming from the sensor 1, and therefore via the wires 13, 14 and the intermediate circuit which will now be described.

The signals present on the two wires 13 and 14 are also applied on an input 31 of the microprocessor 28 via, successively, an adjustable gain amplifier 32 whose gain is adjusted by the microprocessor 28 via a control link 33, and a comparator 34 with one reference voltage Vr, of, for example, 0.2 volts, which furnishes on the input 31 of the microprocessor a logic level "0" or "1." depending on whether the voltage which is applied thereto on its other input 35, at the output of the amplifier 32, is lower or higher than this reference voltage.

The signals finally applied on the input 31 are then rectangular signals whose cyclic ratio depends, if the reference voltage Vr and the gain of the amplifier 32 are fixed, on the frequency and amplitude of the signals delivered by the sensor 1 on its terminals 26 and 27. This cyclic ratio is therefore characteristic both of the sensor 1 and of the speed of the vehicle.

The presence of the adjustable gain amplifier 32 is not absolutely indispensable, but this amplifier is useful not only for obtaining, without difficulty, acceptable input levels for different speeds of displacement of the vehicle, but also for being able to use the same device 17 for a whole range of sensors.

The microprocessor therefore receives these rectangular signals on its input 31 via a link 36, and it calculates the cyclic ratio thereof.

If the values of the impedance tested by the circuit 25 and of this cyclic ratio do not conform to the values that it memorized when installing the taximeter or chronotachograph, and if this non-conformity is not of accidental nature due to a parasite, the microprocessor emits fault signals on its output wires 18 and 20, as explained hereinabove.

Figure 3:
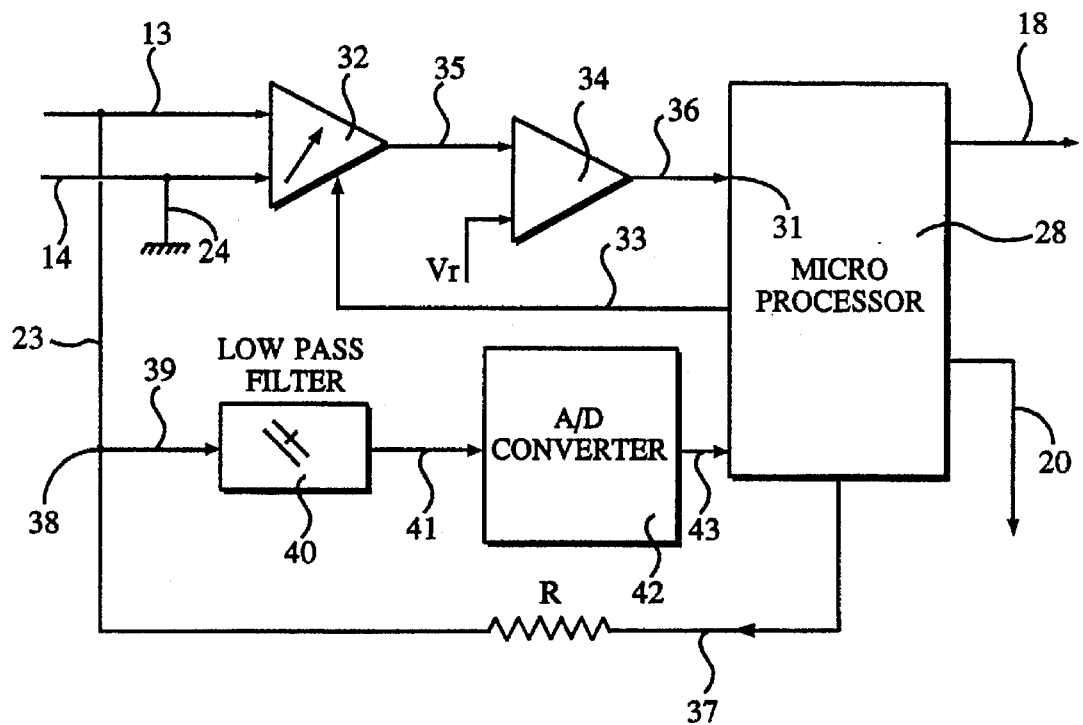
FIG. 3 is a particular embodiment of a characteristic test circuit for carrying out the invention.

A more simple, and improved, form of embodiment of a test device 17 according to FIG. 2 is shown in FIG. 3.

The simplification, and improvement, concern here the test of the impedance, which is replaced by a test of the response of the above-mentioned dipole, i.e. in fact essentially of sensor 1, to a stress in current or in voltage which is made by sending, by the microprocessor 28 and via a link 37 comprising a series resistor R, a variable electric signal through the active dipole present between wires 13 and 14, i.e. in fact through sensor 1.

This electric signal may be a repetitive pulse signal or an alternating signal, of predetermined frequency F1 greater than a minimum value 0f below which the test is virtually not possible and which is determined experimentally. In that case, the test is made when the vehicle is stationary, in order that the comparison according to the invention not be disturbed by the signals delivered by sensor 1 when the vehicle is moving.

From point 38 of potentiometric link between the resistor R and said active dipole there also issues a connection 39 towards a low-pass filter 40 which functions as integrator and which furnishes on its output 41, in response to the signal that it receives from the microprocessor 28 and by the potentiometric assembly constituted by the resistor R and said active dipole, a voltage or a voltage gradient whose amplitude is coded in digitized signals by means of an analog-digital converter 42.

These digitalized signals, which are therefore representative of the response of said dipole to the signal of frequency F1 and therefore, finally, of the internal electrical characteristics of this dipole, are transmitted for analysis to the microprocessor 28 via a link 43.

As a safety precaution, this analysis may be made for several frequencies F1, F2, F3, . . . of signals furnished by the microprocessor 28 on the link 37, instead of being made solely for frequency F1.

According to another embodiment of the circuit of FIG. 3, the stress or test triggering signal which is delivered by microprocessor 28 on link 37 is a fine pulse, with a duration of some tens of microseconds for example, which is sent on this link when the vehicle is moving at a speed less than a predetermined speed (above which the test would not be possible for lack of sufficient time between two successive pulses present on wire 36), and immediately after the descending edge of each pulse present on wire 36, at the input 31 of the microprocessor 28. For example, this maximum speed corresponds to a frequency of the signals of the sensor which is of the order of 200 Hertz.

The integrated signal which is then collected on wire 41, on leaving the low-pass filter 40, is then a voltage gradient which characterizes the response of the dipole to the sending of this fine pulse. It is this voltage gradient which is digitized by the converter 42 to be analyzed and compared by the microprocessor 28. Of course, this comparison must be terminated before the rising edge of the next pulse coming from sensor 1 and present on input 31.

By way of example, this fine pulse is sent by the microprocessor 28 between about ten microseconds to some milliseconds after said descending edge of the pulse coming from sensor 1.

Consequently, the comparison of the internal characteristics of the dipole with those previously memorized may be effected when the vehicle is moving normally. Of course, in the preceding case where the comparison of these internal characteristic is effected when the vehicle is stationary, it is also possible to apply, instead of a signal of frequency F1, F2, F3, . . . , a test triggering pulse and to note in the same way the pulse response, i.e. the voltage gradient, which results on the output 41 of the low-pass filter 40. However, this modus operandi is less advantageous than that which has just been described, since it requires that the vehicle be stationary.

Figure 4:
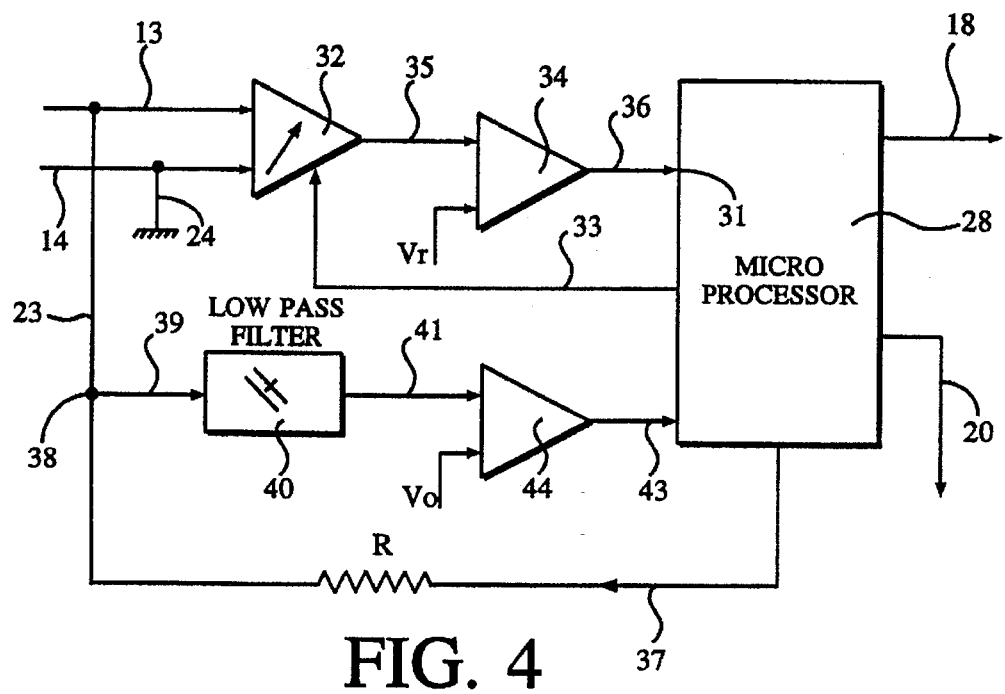
FIG. 4 shows a more economical variant embodiment of the circuit of FIG. 3.

The circuit according to FIG. 3 may be simplified as shown in FIG. 4, in order to dispense with the presence of the analog-digital converter 42 which is a relatively expensive component.

In that case, the signal—voltage gradient or integrated voltage—which appears on the wire 41 on leaving the low-pass filter 40 is applied on a first input of an analog comparator 44 which receives on its other input a reference voltage Vo.

This results, on its output wire 43, in a logic level "0" or "1" which is applied to the microprocessor 28 depending on whether the voltage on wire 21 is lower or higher than the voltage Vo. The microprocessor 28 analyzes the time shift between the moment when it emits its test signal on link 37 and the moment when it receives a logic level "1" on its input 43. It deduces therefrom the particular response of the above-mentioned dipole to this test signal and characterizes by this response said internal electric characteristics of this dipole.

Figure 5:
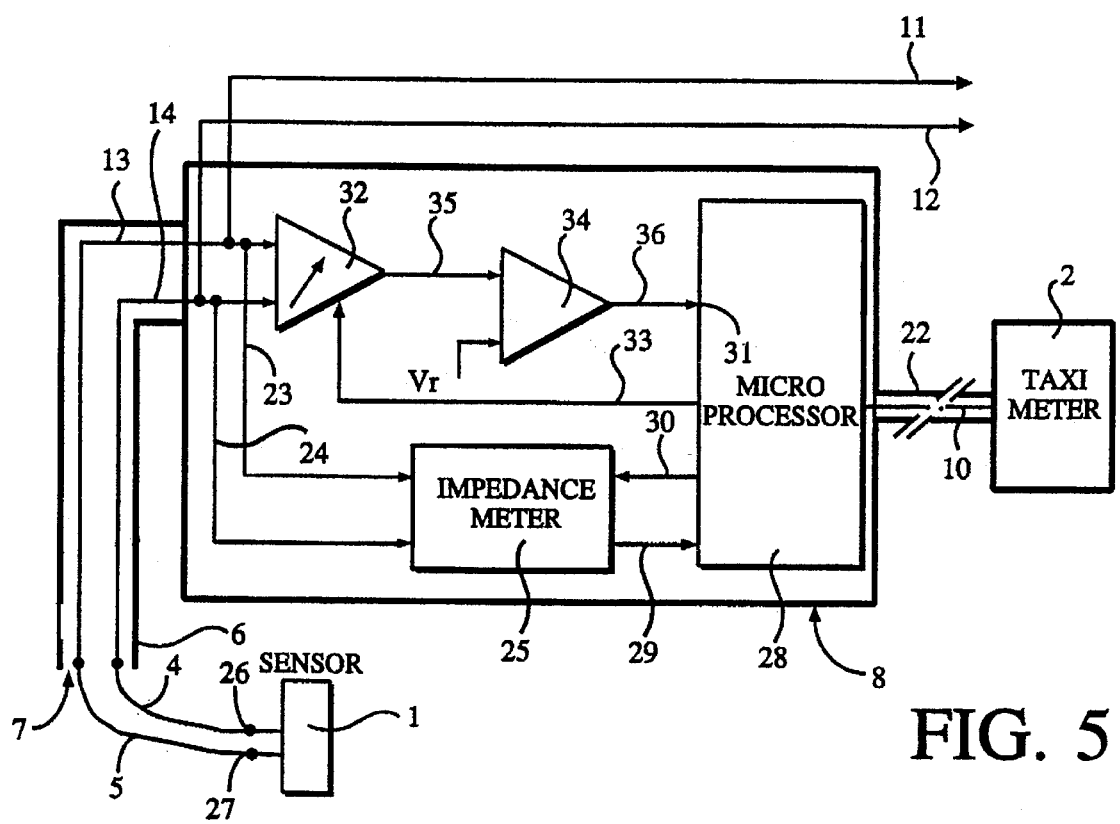
FIG. 5 is a block diagram of another embodiment of a device according to the invention.

An advantageous variant embodiment of the device according to FIGS. 1 and 2 is shown schematically in FIG. 5.

In FIG. 5, the signals of sensor 1 are, in exactly the same manner, applied to the A.B.S. circuits and to the speedometer via wires 11 and 12, to the circuit 25 for testing the internal electric characteristics of the active dipole present between the output signal wires 4 and 5 of sensor 1, this circuit 25 always being connected to microprocessor 28 by the same links 29 and 30, and to microprocessor 28 via the same adjustable gain amplifiers 32 and comparator 34.

In order to be able clearly to compare the circuit of FIG. 5 with that of FIGS. 1 and 2, all the common elements are designated by the same references.

The circuit of FIG. 5 comprises neither separation amplifier 9 nor static relay 21, nor alarm link 18 towards the instrument panel. The output signals of sensor 1 are, as before, applied to the microprocessor 28 via the adjustable gain amplifier 32 and the comparator 34, but it is the microprocessor itself which converts these signals into information pulses which are directly transmitted, via the output wire 10 passing in the shielded cable 22, to the microprocessor which equips the taximeter or chronotachograph 2.

It goes without saying that, in the event of nonconformity, and therefore of detection of fraud, the signals thus transmitted to the taximeter or chronotachograph 2 are no longer only signals representative of the speed signal delivered by sensor 1, or are such signals no longer, but are information signals indicating detection of fraud. As before, these latter signals prevent correct functioning of the taximeter or chronotachograph 2, as this latter no longer takes into account the information supposed to represent the number of wheel revolutions, and they may also trigger off a visual and/or sound alarm.

The information signals indicating detection of fraud are, very generally, particular signals. They may for example be quite simply speed signals quite improbable for the vehicle concerned, or the like.

It goes without saying that the invention is in no way limited to the embodiments which have just been described.

For example, all the circuit located in the shielded box 8 may quite simply be included in the taximeter or chronotachograph 2, which would make it possible not only to dispense with the shielded box 8 and the shielded cable 22, but also to combine microprocessor 28 and the microprocessor of the taximeter or chronotachograph, in one microprocessor.

The choice of the cyclic ratio of the pulses as characteristic of the signal is preferential for its simplicity, but the choice is not limiting. For example, the variation curve of the peak voltage of the electric signal furnished by this sensor as a function of the speed of the vehicle may be chosen as characteristic, or its response to an acceleration or a deceleration of the vehicle, i.e. the frequency drift of the signal emitted by this sensor with respect to time. If such acceleration or deceleration is abnormally rapid, for example if one passes from 0 to 100 km/hr in two seconds, there is necessarily fraud at the level of the output wires of the sensor.

Instead of checking one sole characteristic of the signal, several may also be checked.

Sensor 1 may, of course, be an electronic sensor of any other type, or may be constituted by a mechanical sensor conventionally provided with a device for converting mechanical pulses into electric pulses: it is this assembly which is then called "electronic sensor" within the meaning of the present invention.

What is claimed is:

1. A process for preventing fraud in a vehicle equipped with one of a taximeter and chronotachograph, said vehicle being equipped with at least one electronic sensor which is used at least for supplying a signal to said one of said taximeter and chronotachograph, comprising the steps of:

monitoring, in parallel, two electric signal output wires of said sensor; and triggering an electronic anti-fraud action, including at least modifying electronic data normally transmitted to said one of said taximeter and chronotachograph, if, during said monitoring step, at least one of (a) an internal characteristic of an active dipole then present between said two wires and (b) a characteristic of said electric signal available between said two wires during normal displacement of said vehicle, has been modified with respect to reference values.

2. The process of claim 1, wherein said internal characteristic of said active dipole is impedance.

3. The process of claim 1, further comprising testing said internal characteristic when said vehicle is stationary.

4. The process of claim 1, wherein said characteristic of said signal is a curve of variation, as a function of speed of said vehicle, of the peak voltage of said electric signal furnished by said sensor.

5. The process of claim 1, wherein said characteristic of said signal is the derivative with respect to time of the frequency of said signal emitted by said sensor.

6. The process of claim 1, wherein said at least one of (a) an internal characteristic of said active dipole and (b) a characteristic of said electric signal available between said two wires is deemed fraudulent only if recurrent or of abnormal amplitude compared to said reference values.

7. The process of claim 1, further comprising testing said characteristic of said electric signal when said vehicle is moving at a speed greater than a predetermined speed.

8. The process of claim 1, wherein said reference values are previously memorized reference values.

9. The process of claim 8, further comprising, after installing said one of said taximeter and chronotachograph in said vehicle, the steps of:

measuring said at least one of (a) an internal characteristic of said active dipole and (b) a characteristic of said electric signal available between said two wires, by driving said vehicle at predetermined speed;

memorizing said measured characteristics;

testing for said at least one of (a) an internal characteristic of said active dipole and (b) a characteristic of said electric signal available between said two wires; and comparing, during said monitoring step, said memorized characteristics and said characteristics obtained by testing.

10. The process of claim 1, further comprising testing said internal characteristic by injecting at least one of a variable voltage and current through said active dipole and noting one of a corresponding impulse and frequency response.

11. The process of claim 10, further comprising obtaining said impulse response via an integrator connected to said active dipole.

12. The process of claim 11, wherein said injecting step is effected after a falling edge of a rectangular signal issuing from said sensor when said vehicle is moving at a speed less than a predetermined speed.

13. The process of claim 1, wherein said characteristic of said electric signal available between said two wires is a cyclic ratio of impulses corresponding to a rectangular signal issuing from said sensor.

14. The process of claim 13, wherein said anti-fraud action is triggered if a monitored value of said cyclic ratio differs by at least a predetermined value of said cyclic ratio under normal conditions.

15. The process of claim 14, wherein said anti-fraud action is triggered only if a number of impulses per second furnished by said sensor corresponds to a speed of said vehicle which is greater than a minimum speed.

16. The process of claim 14, wherein parasitic accidental impulses having abnormal form are ignored so that said anti-fraud action is not triggered.

17. An anti-fraud device for a vehicle equipped with a taximeter or chronotachograph, comprising:

memorizing means for memorizing reference values representing at least one of signal levels and internal characteristics of an active dipole present between two wires of a sensor for sensing the rotation of a wheel, said memorizing means connected in parallel with said sensor;

comparing means for comparing at least one of real-time sensor signal values and internal characteristics of said active dipole with memorized reference values memorized in said memorizing means and for outputting a trigger signal when said at least one of said real-time sensor signal values and internal characteristics vary from said memorized reference values, said comparing means also connected in parallel with said sensor;

anti fraud means, connected to said memorizing and comparing means and responsive to said trigger signal, for at least modifying electronic data normally transmitted to said taximeter or chronotachograph; and a mechanically impregnable envelope surrounding said memorizing, comparing and anti-fraud means.

18. The anti-fraud device of claim 17 further comprising impregnable mechanical protection means surrounding an electric connection between said anti-fraud device and a point of articulation of said sensor and said wheel with which said sensor is associated, and between said anti-fraud device and said taximeter or chronotachograph.

19. The anti-fraud device of claim 17 wherein said comparing means includes calculation and logic control means for at least effecting said comparing and trigger signal outputting.

20. The anti-fraud device of claim 19 wherein said calculation and logic control means further effects calculation of said internal characteristics of said active dipole.

21. The device of claim 19 wherein said calculation and logic control means further comprises an output connected, through a resistor, to one of said wires comprising said active dipole, and a junction point of said resistor and said one of said wires is connected to an input of said calculation and logic control means via an integrator and an analog-to-digital converter.

* * * * *